United States Patent
Nakanishi et al.

(10) Patent No.: US 7,538,831 B2
(45) Date of Patent: May 26, 2009

(54) TOUCH PANEL

(75) Inventors: Akira Nakanishi, Fukui (JP); Shigeyuki Fujii, Fukui (JP)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 11/606,990

(22) Filed: Dec. 1, 2006

(65) Prior Publication Data

US 2007/0128948 A1 Jun. 7, 2007

(30) Foreign Application Priority Data

Dec. 1, 2005 (JP) .............................. 2005-347621

(51) Int. Cl.
*G02F 1/1333* (2006.01)
(52) U.S. Cl. .............................. 349/58; 349/59; 349/60; 345/87; 345/104; 345/173; 345/176; 361/681
(58) Field of Classification Search .................. 349/12, 349/58–60; 345/173, 176, 104, 87; 178/18.01; 439/660; 361/681
See application file for complete search history.

(56) References Cited

U.S. PATENT DOCUMENTS

| | | | | |
|---|---|---|---|---|
| 6,310,614 | B1 * | 10/2001 | Maeda et al. ................. | 345/173 |
| 6,572,941 | B1 * | 6/2003 | Murakami et al. ............. | 428/34 |
| 6,721,019 | B2 * | 4/2004 | Kono et al. .................... | 349/12 |
| 7,161,558 | B1 * | 1/2007 | Eidem et al. .................. | 345/3.1 |
| 2005/0219349 | A1 | 10/2005 | Takeya et al. | |

FOREIGN PATENT DOCUMENTS

CN 1676342 A 10/2005
JP 2005-11312 1/2005

OTHER PUBLICATIONS

Chinese Office Action, with English Translation, issued in corresponding Chinese Patent Application No. 200610163543.0 issued on Nov. 23, 2007.

\* cited by examiner

*Primary Examiner*—Julie Ngo
(74) *Attorney, Agent, or Firm*—McDermott Will & Emery LLP

(57) ABSTRACT

A touch panel includes a light-transmissible upper board, an upper resistor layer on a lower surface of the upper board, a light-transmissible lower board, a lower resistor layer provided on an upper surface of the lower board and facing the upper resistor layer with a predetermined distance, a spacer having a substantial frame shape between an outer periphery of the lower surface of the upper board and an outer periphery of the upper surface of the lower board, upper electrodes extending from both ends of the upper resistor layer, lower electrodes extending from both ends of the lower resistor layer, a wiring board, and wiring patterns on the wiring board. The spacer has a cutout portion provided therein. The upper and lower electrodes have portions located at the cutout portion of the spacer. The wiring board has an end located at the cutout portion. The wiring patterns are connected to the portions of the upper electrodes and the portions of the lower electrodes, respectively. An elastic adhesive seals the cutout portion of the spacer. This touch panel allows the wiring patterns to be connected electrically to the electrodes stably, and insulates between the wiring patterns and between electrodes, thus being reliable.

6 Claims, 3 Drawing Sheets

TOUCH PANEL

TECHNICAL FIELD

The present invention relates to a touch panel used for operations of various electronic devices.

BACKGROUND ART

An electronic device, such as a mobile phone and a car navigation system, has had higher performance and various functions, and often includes a light-transmissible touch panel attached onto a front surface of a display element, such as a liquid crystal display. An operator presses the touch panel with a finger or a pen while looking at the display element through the touch panel, thereby switching the functions to operate the device. This touch panel is demanded to be reliably operated and not to prevent the operator from looking at the display element.

FIGS. 4 and 5 are a side sectional view and a plane sectional view of conventional touch panel 5001 disclosed in Japanese Patent Laid-Open Publication No. 2005-11312, respectively. Upper board 501 has a film shape and is light-transmissible. Light-transmissible upper resistor layer 503 made of resistor material, such as indium tin oxide, is provided on a lower surface of upper board 501. Lower resistor layer 504 is provided on an upper surface of light-transmissible lower board 502.

Plural dot spacers made of insulating resin are arranged on an upper surface of lower resistor layer 504 by predetermined intervals. Pair of Upper electrodes are provided at both ends of upper resistor layer 503, respectively. Pair of lower electrodes 505 are provided at both ends of lower resistor layer 504 and arranged in a direction orthogonal to a direction along which the pair of upper electrodes are arranged. The upper electrodes and lower electrodes 505 are made of conductive material including silver.

Spacer 506 having a substantial frame shape is provided on an outer periphery of a lower surface of upper board 501 or on an outer periphery of an upper surface of lower board 502. An upper surface and a lower surface of spacer 506 are coated with adhesion layers causing the upper and lower surfaces of spacer 506 to adhere onto an outer periphery of upper board 501 and an outer periphery of lower board 502, respectively. Spacer 506 causes upper resistor layer 503 to face lower resistor layer 504 with a predetermined space between the layers. Spacer 506 includes cutout portion 506A to which respective end portions of the upper electrodes and lower electrodes 505 extend.

Upper wiring patterns 508 made of conductive material, such as silver, are formed on an upper surface of wiring board 507 having a film shape. Lower wiring patterns 509 made of conductive material is formed on a lower surface of wiring board 507. Insulating layers 522 covering wiring patterns 508 and 509 are formed on the upper surface and the lower surface of wiring board 507, respectively, so that both end portions of wiring patterns 508 and 509 expose from layers 522, respectively. An end of wiring board 507 is located between upper board 501 and lower board 502 in cutout portion 506A of spacer 506.

Anisotropic conductive adhesive 510 contains synthetic resin and conductive particles dispersed in the synthetic resin. Anisotropic conductive adhesive 510 causes an end of wiring board 507 to adhere onto upper board 501 and lower board 502. Anisotropic conductive adhesive 510 is conductive only in direction 5001A orthogonal to wiring board 507 and is not conductive in directions, such as directions 5001B and 5001C, in parallel with wiring board 507. Anisotropic adhesive 510 electrically connects the upper electrodes to end portions of upper wiring patterns 508 and connects lower electrodes 505 to end portions of lower wiring patterns 509.

Touch panel 5001 is located on a display surface of a display element, such as a liquid crystal display, to be attached to an electronic device. The end portions of upper wiring patterns 508 and lower wiring patterns 509 on wiring board 507 are connected to an electronic circuit of the device with a connector or by soldering.

An operator presses the upper surface of upper board 501 with a finger or a pen while looking at the display surface of the display element through the touch panel. Then, upper board 501 accordingly sags to cause upper resistor layer 503 at a pressed portion to contact lower resistor layer 504.

The electronic circuit of the electronic device alternately applies a voltage to the upper electrodes and lower electrodes 505 via upper wiring patterns 508 and lower wiring patterns 509 on wiring board 507. The electronic circuit detects the position of the pressed portion based on a voltage ratio between these electrodes, and switches functions to control the device In conventional touch panel 5001, the end portions of upper wiring patterns 508 and lower wiring patterns 509 expose from insulating layer 522. The end portions of the upper electrodes and lower electrodes 505 positioned at region 5001D outside of spacer 506 having the substantially frame shape expose. These wiring patterns and electrodes contain silver, and hence, may be sulfurized or cause silver migration producing minute precipitates between the patterns when the wiring patterns and electrodes are used in an environment including a large amount of moisture or gas. In this case, the wiring patterns cannot be connected electrically to the electrodes stably, and prevented from having a stable insulation between the wiring patterns or between the electrodes.

SUMMARY OF THE INVENTION

A touch panel includes a light-transmissible upper board, an upper resistor layer on a lower surface of the upper board, a light-transmissible lower board, a lower resistor layer provided on an upper surface of the lower board and facing the upper resistor layer with a predetermined distance, a spacer having a substantial frame shape between an outer periphery of the lower surface of the upper board and an outer periphery of the upper surface of the lower board, upper electrodes extending from both ends of the upper resistor layer, lower electrodes extending from both ends of the lower resistor layer, a wiring board, and wiring patterns on the wiring board. The spacer has a cutout portion provided therein. The upper and lower electrodes have portions located at the cutout portion of the spacer. The wiring board has an end located at the cutout portion. The wiring patterns are connected to the portions of the upper electrodes and the portions of the lower electrodes, respectively. An elastic adhesive seals the cutout portion of the spacer.

This touch panel allows the wiring patterns to be connected electrically to the electrodes stably, and insulates between the wiring patterns and between electrodes, thus being reliable.

DETAILED DESCRIPTION OF THE PREFERRED EMBODIMENT

Figure 1:
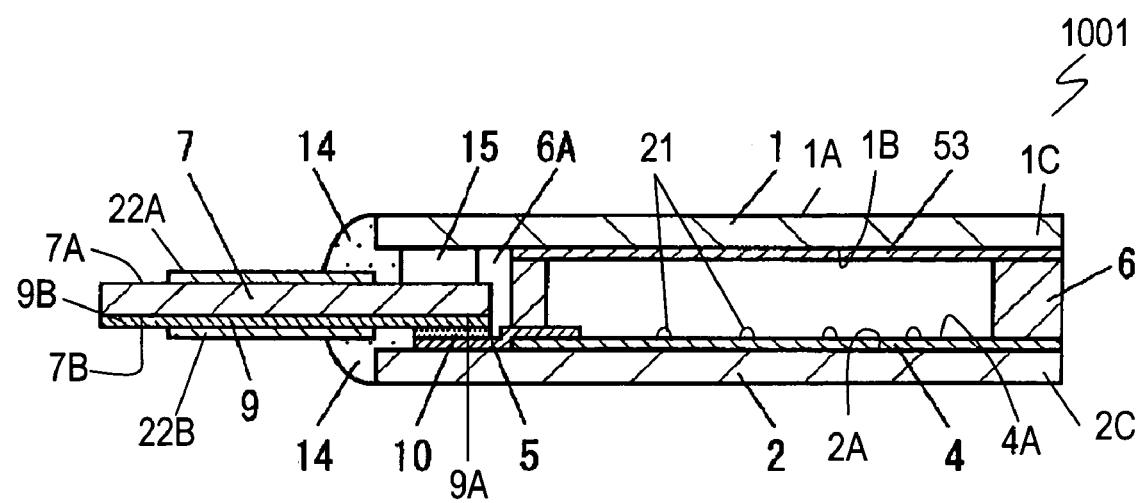
FIG. 1 is a side sectional view of a touch panel according to an exemplary embodiment of the present invention.
Figure 2:
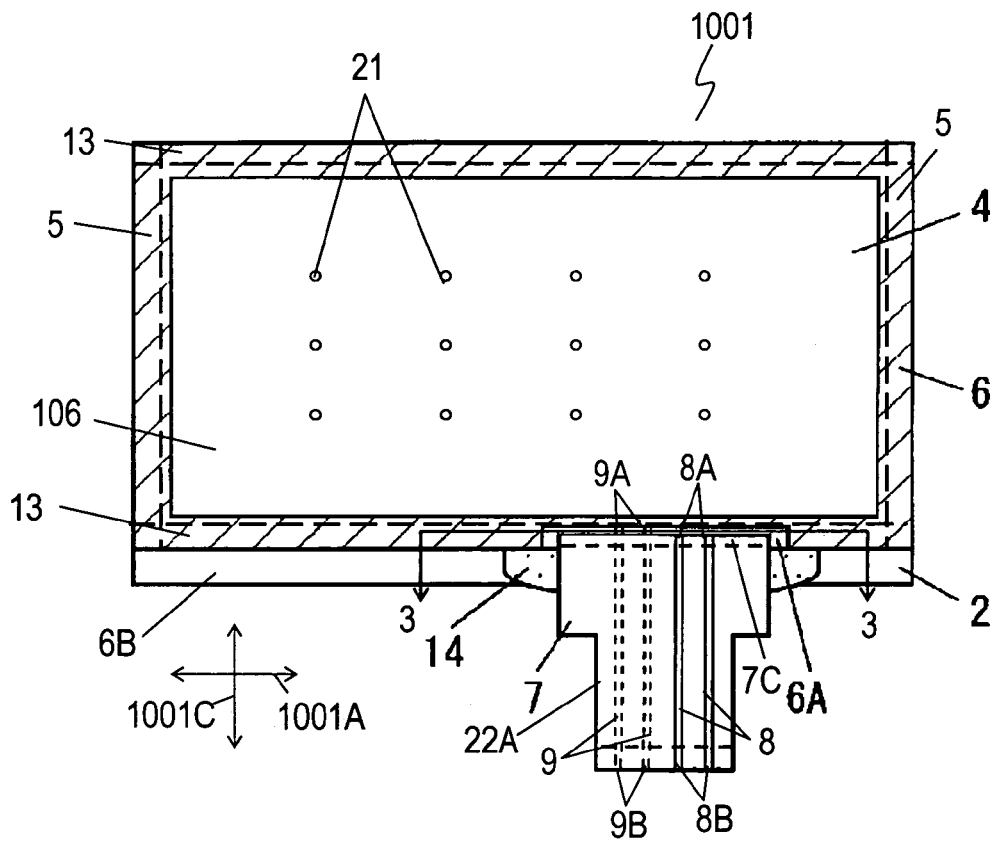
FIG. 2 is a plane sectional view of the touch panel according to the embodiment.
Figure 3:
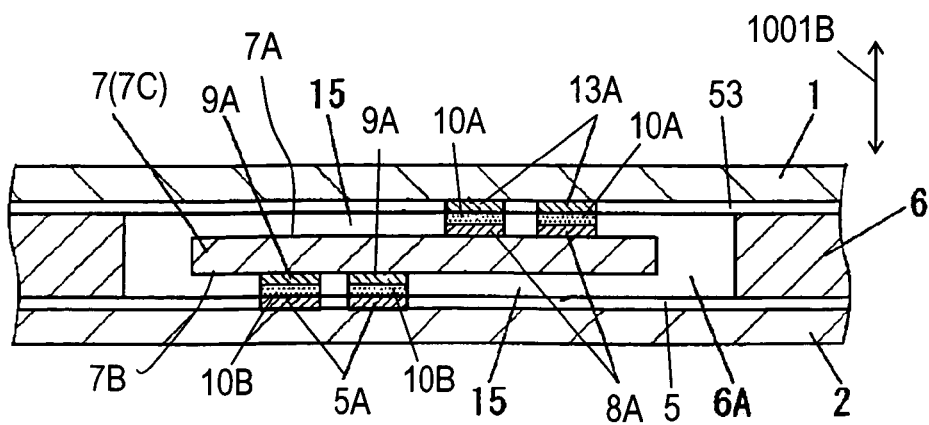
FIG. 3 is a partial cross sectional view of the touch panel at line 3-3 shown in FIG. 2.
Figure 4:
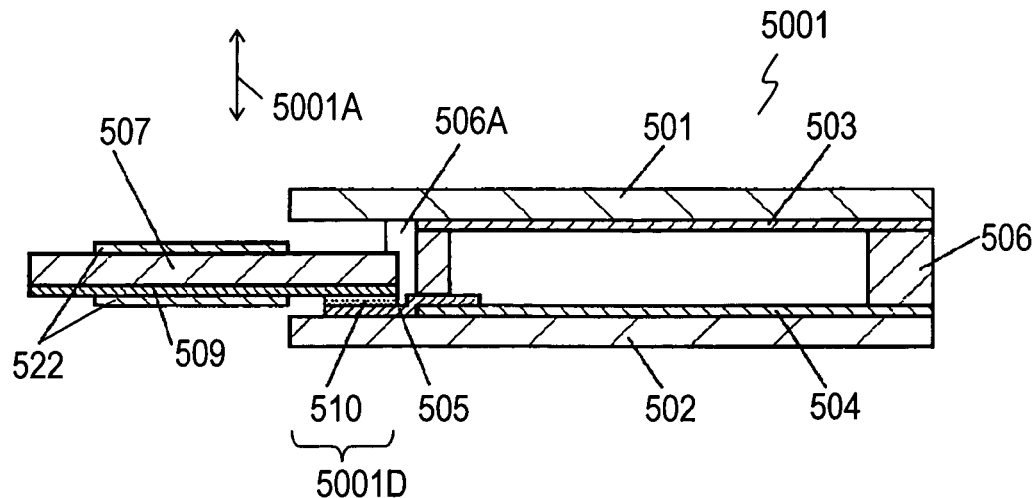
FIG. 4 is a side sectional view of a conventional touch panel.
Figure 5:
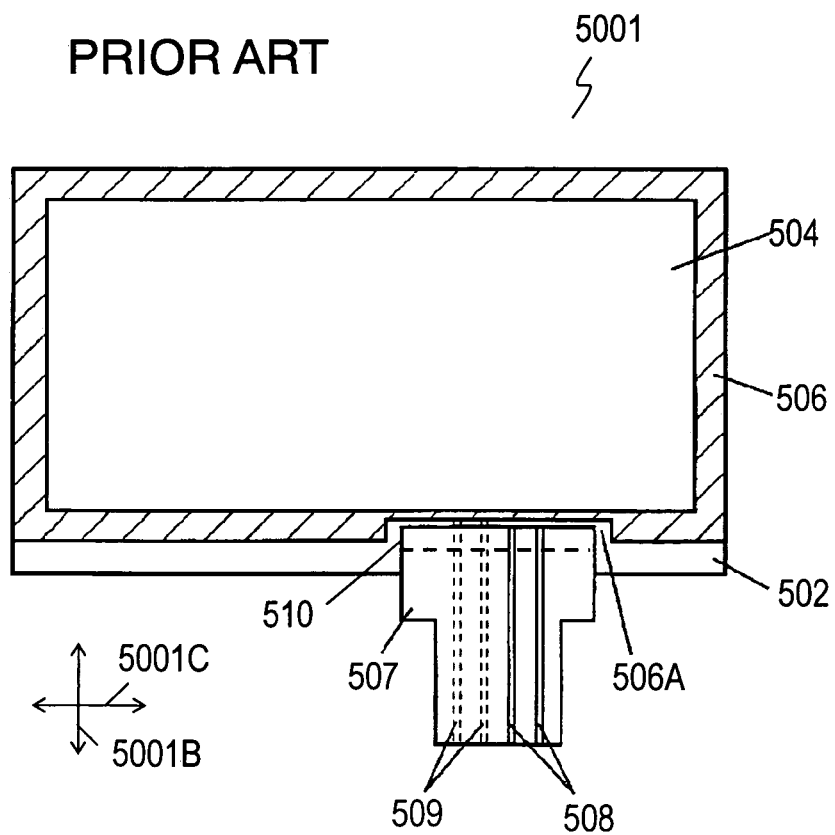
FIG. 5 is a plane sectional view of the conventional touch panel.

FIGS. 1 and 2 are a side sectional view and a plane sectional view of touch panel 1001 according to an exemplary embodiment of the present invention, respectively. FIG. 3 is a partial cross sectional view of touch panel 1001 at line 3-3 shown in FIG. 2. Upper board 1 is light-transmissible and is made of insulating flexible film, such as polyethylene terephthalate film or polycarbonate film. Lower board 2 is light-transmissible and is made of insulating material, such as glass, acryl, or polycarbonate. Upper resistor layer 53 made of light-transmissible resistor material, such as indium tin oxide or tin oxide, is formed on lower surface 1B of upper board 1 by, for example, a sputtering method. Lower resistor layer 4 made of resistor material, such as indium tin oxide or tin oxide is formed on upper surface 2A of lower board 2 by, for example, a sputtering method. Dot spacers 21 made of insulating resin, such as epoxy or silicone are formed on upper surface 4A of lower resistor layer 4 with predetermined intervals. Lower electrodes 5 made of conductive material, such as silver or carbon, are formed at both ends of lower resistor layer 4 which are arranged in direction 1001A, respectively. Upper electrodes 13 made of conductive material, such as silver or carbon, are formed at both ends of upper resistor layer 53 which are arranged in direction 1001C orthogonal to direction 1001A, respectively.

Spacer 6 has a substantial frame shape and is made of insulating and inelastic material, such as non-woven fabric, epoxy, acrylate, polyester or polyester. Spacer 6 is provided between upper board 1 and lower board 2 and is adhered to outer periphery 1C of lower surface 1B of upper board 1 and outer periphery 2C of upper surface 2A of lower board 2 with adhesive, such as acryl adhesive or rubber adhesive. Spacer 6 allows upper resistor layer 53 to face lower resistor layer 4 with a predetermined space between the layers. Spacer 6 has cutout portion 6A provided therein from outer region 6B of the substantial frame shape. Cutout portion 6A prevents inner region 106 of spacer 6 from communicating with outer region 6B. End portion 13A of upper electrode 13 and end portion 5A of lower electrode 5 are positioned and expose at cutout portion 6A. That is, upper electrodes 13 extend from the both ends of upper resistor layers, and lower electrodes 5 extend from the both ends of lower resistor layer 4.

Wiring board 7 is made of resin film, such as polyethylene terephtalate film, polyimide film, or polycarbonate film. Upper wiring patterns 8 made of conductive material, such as silver, carbon, or copper, are formed on upper surface 7A of wiring board 7. Lower wiring patterns 9 made of conductive material, such as silver, carbon, or copper, are formed on lower surface 7B of wiring board 7. Insulating layers 22A and 22B are formed on upper surface 7A and lower surface 7B of wiring board 7, respectively. Insulating layer 22A covers upper wiring pattern 8 to allow end portions 8A and 8B of upper wiring patterns 8 to expose. Insulating layer 22B covers lower wiring pattern 9 to allow end portions 9A and 9B of lower wiring patterns 9 to expose. End 7C of wiring board 7 is provided between upper board 1 and lower board 2 at cutout portion 6A of spacer 6.

Anisotropic conductive adhesives 10A and 10B allow end 7C of wiring board 7 to adhere and fixed to upper board 1 and lower board 2. Anisotropic conductive adhesives 10A and 10B contains synthetic resin, such as polyester rubber or chloroprene rubber, and conductive particles dispersed in the synthetic resin. The conductive particles may be particles, such as nickel or resin, having surfaces plated with gold. Anisotropic conductive adhesive 10A provides adhesion and electrical connection between upper electrode 13 and end portion 8A of upper wiring pattern 8. Anisotropic conductive adhesive 10B provides adhesion and electrical connection between lower electrode 5 and end portion 9A of lower wiring pattern 9. Anisotropic conductive adhesives 10A and 10B are conductive in direction 1001B along which electrode 5 of end portion 5A and end portion 8A of wiring pattern 8 are arranged, and end portion 9A of wiring pattern 9 and end portion 8A of wiring pattern 8 are arranged. Adhesive 10A and 10B are not conductive in directions, such as directions 1001A and 1001C, orthogonal to direction 1001B.

Elastic adhesive 14 is made of silicone, chloroprene, urethane rubber, acryl, or mixture thereof. Elastic adhesive 14 seals cutout portion 6A of spacer 6, end 7C of wiring board 7, upper board 1, and lower board 2. As shown in FIGS. 1 and 3, elastic adhesive 14, spacer 6, upper board 1, and lower board 2 provides sealed space 15. End portion 8A of upper wiring pattern 8 and end portion 9A of lower wiring pattern 9 which are located at end 7C of wiring board 7 are located in space 15. Space 15 is provided around wiring board 7.

Touch panel 1001 is provided on a display surface of a display element, such as a liquid crystal display, and attached to an electronic device. Upper wiring pattern 8 on wiring board 7 and end portions 8B and 9B of lower wiring pattern 8 and upper wiring pattern 9 are connected to an electronic circuit of the device with a connector or by soldering.

When an operator presses upper surface 1A of upper board 1 with a finger or a pen while looking at the display surface of the display element through touch panel 1001, upper board 1 locally sags to cause the pressed portion of upper resistor layer 53 to contact lower resistor layer 4. The electronic circuit alternately applies a voltage to upper electrodes 13 and to lower electrodes 5 via upper wiring pattern 8 and lower wiring pattern 9 on wiring board 7. The electronic circuit detects voltages of an electrode out of upper electrode 13 and lower electrode 5 to which the voltage is not applied as to calculate the position of the pressed portion and to switch various functions of the device accordingly.

As shown in FIGS. 1 and 2, elastic adhesive 14 seals space 15 provided at cutout portion 6A of spacer 6 between boards 1 and 2, thereby cutting off end portions 8A and 9A of upper wiring pattern 8 and lower wiring pattern 9 and end portions 13A and 5A of upper electrode 13 and lower electrode 5 from external air. This structure prevents sulfurization of the end portions of electrodes 13 and 5 and wiring patterns 8 and 9 and silver migration producing minute precipitates between the patterns even when the device is used in an environment including a large amount of moisture or gas. Thus, this structure allows the electrodes and the wiring patterns to be electrically connected stably.

Elastic adhesive 14 is not curable and is relatively soft and elastic. Even when upper board 1, lower board 2, and wiring board 7 contract or expand due to surrounding temperature or moisture, elastic adhesive 14 absorbs this contraction or expansion to prevents, accordingly preventing upper and lower electrodes 13 and 5 from unstably contacting upper and lower wiring patterns 8 and 9 due to the dislocating or peeling off of wiring board 7.

As shown in FIGS. 1 and 3, sealed space 15 surrounding end 7C of wiring board 7 is not filled with elastic adhesive 14. This structure allows wiring board 7 to smoothly contract and expand according to the surrounding temperature and humidity. Thus, wiring board 7 can be prevented from being dislocated or peeled off from lower board 2 and upper board 1.

Elastic adhesive 14 may be made of silicone, chloroprene, urethane rubber, acryl, or mixture thereof. Elastic adhesive 14 is preferably made of soft material having shore hardness A less than 70 in consideration of the absorbing of the contraction and expansion of upper board 1, lower board 2, and wiring board 7.

Elastic adhesive 14, containing solvent, may become excessively soft, and flow into a back surface of a surface at which wiring board 7 is connected by adhesion, thereby not providing space 15. Elastic adhesive 14 may be made of material having a viscosity ranging preferably from 10 Pa·s to 150 Pa·s as to be applied easily and to provide space 15 relatively easily.

Touch panel 1001 according to the embodiment includes wiring board 7 having upper surface 7A and lower surface 7B having upper wiring pattern 8 and lower wiring pattern 9 thereon, respectively. The touch panel according to the embodiment may include, instead of wiring board 7, a wiring board having a single surface having wiring patterns thereon. The touch panel according to the embodiment may include, instead of wiring board 7, a wiring board which has through holes at an end of the wiring board arranged to be connected electrodes 5 and 13, respectively, and which has a single surface having a wiring pattern only at the end.

What is claimed is:

1. A touch panel comprising:
   a light-transmissible upper board having an upper surface and a lower surface;
   an upper resistor layer provided on the lower surface of the upper board;
   a light-transmissible lower board having an upper surface and a lower surface;
   a lower resistor layer provided on the upper surface of the lower board, the lower resistor layer facing the upper resistor layer with a predetermined distance between the upper resistor layer and the lower resistor layer;
   a spacer provided between an outer periphery of the lower surface of the upper board and an outer periphery of the upper surface of the lower board, the spacer having a substantial frame shape having a cutout portion provided therein;
   a plurality of upper electrodes extending from both ends of the upper resistor layer, respectively, the plurality of upper electrodes having portions located at the cutout portion of the spacer;
   a plurality of lower electrodes extending from both ends of the lower resistor layer, respectively, the plurality of upper electrodes having portions located at the cutout portion of the spacer;
   a wiring board having an end located at the cutout portion of the spacer;
   a plurality of wiring patterns provided on the wiring board, the plurality of wiring patterns being connected to the portions of the plurality of upper electrodes and the portions of the plurality of lower electrodes, respectively; and
   an elastic adhesive for sealing the cutout portion of the spacer such that the elastic adhesive seals the portions of the upper electrodes and the portions of the lower electrodes, the elastic adhesive being made of material having insulating property.

2. The touch panel according to claim 1, wherein the elastic adhesive provides a space around the end of the wiring board.

3. The touch panel according to claim 1, further comprising an anisotropic conductive adhesive for connecting the plurality of wiring patterns to the portions of the plurality of upper electrodes and the portions of the plurality of lower electrodes, respectively.

4. The touch panel according to claim 1, wherein the both ends of the upper resistor layer are arranged in a predetermined direction; and the both ends of the lower resistor layer are arranged in a direction orthogonal to the predetermined direction.

5. The touch panel according to claim 1, wherein the elastic adhesive protrudes outside the cutout portion.

6. The touch panel according to claim 1, wherein the cutout portion extends inward from an outside surface of the substantial frame shape spacer.

* * * * *